Nov. 19, 1968  L. M. PUSTER  3,411,533
CONTROLLING AND INDICATING UNIT AND SYSTEM
Filed Feb. 8, 1967  2 Sheets-Sheet 2
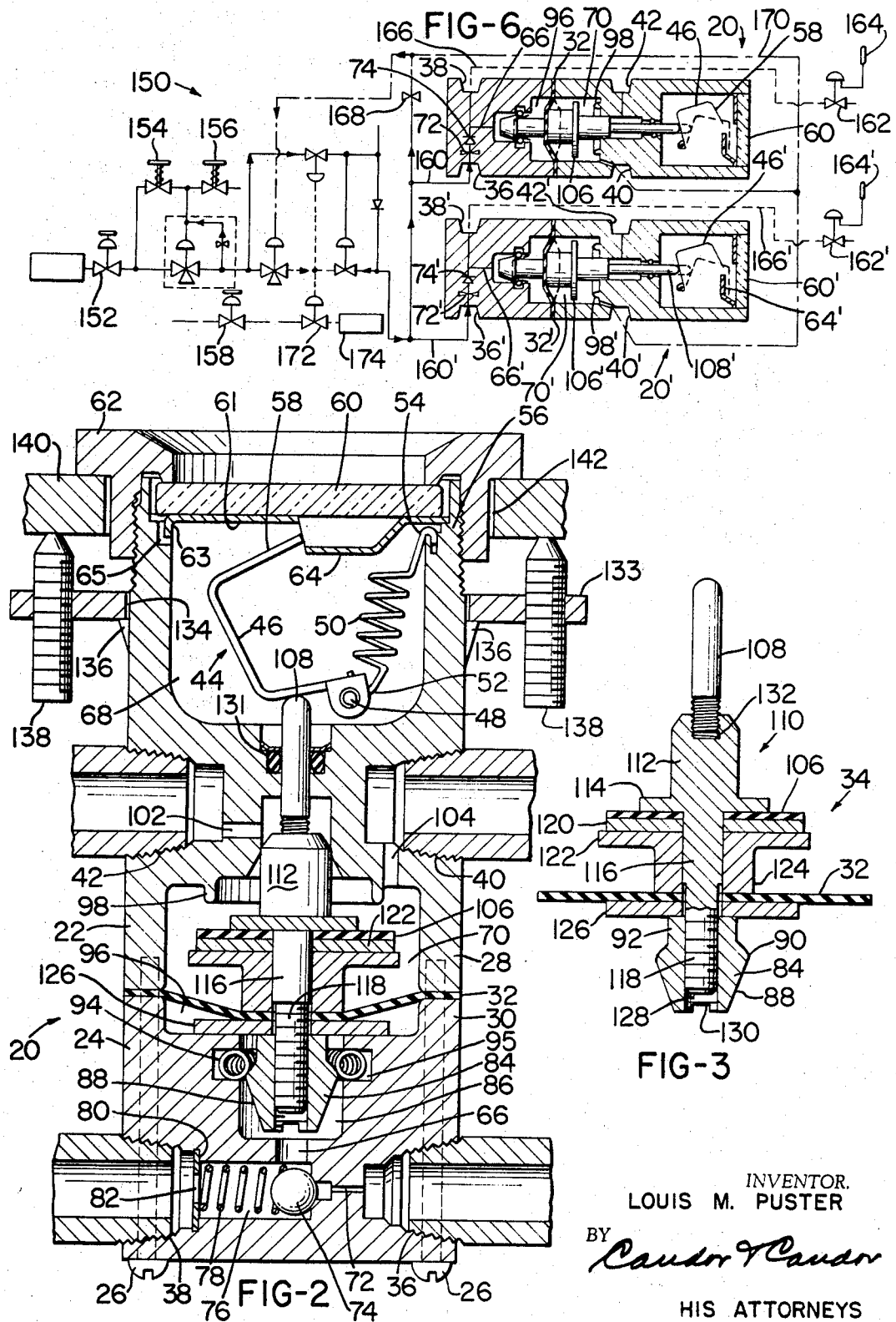
INVENTOR.
LOUIS M. PUSTER
BY *Candor & Candor*
HIS ATTORNEYS

United States Patent Office 3,411,533
Patented Nov. 19, 1968

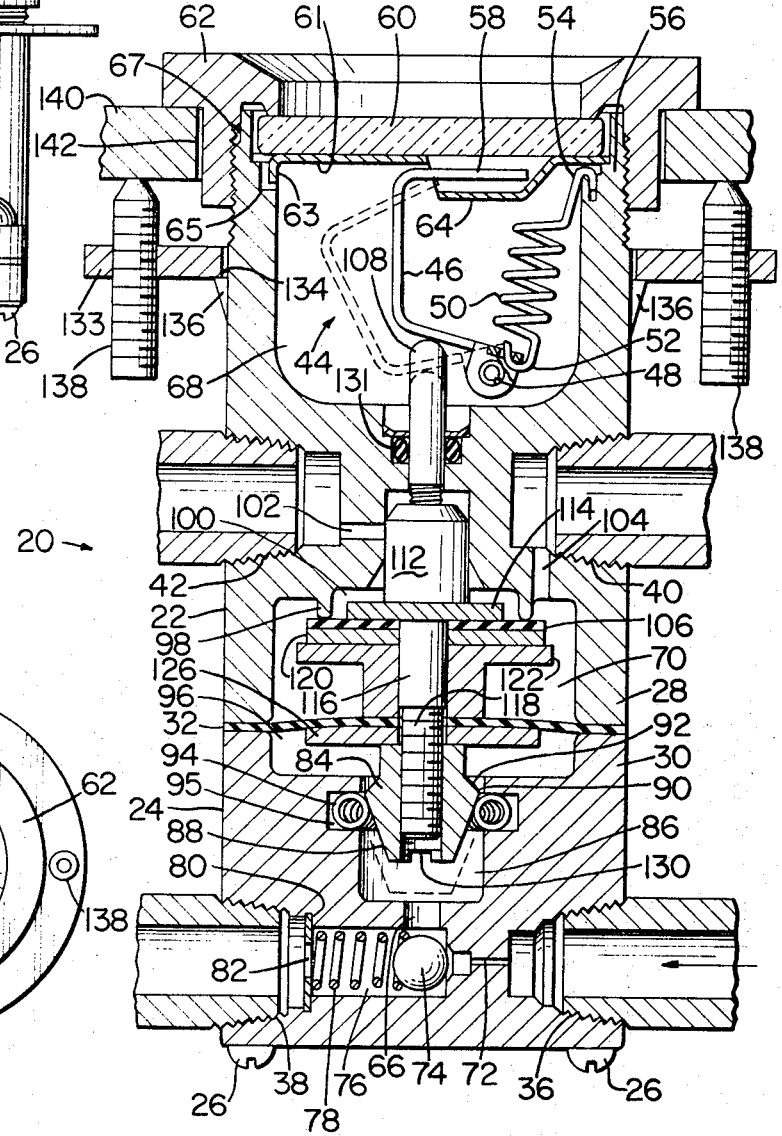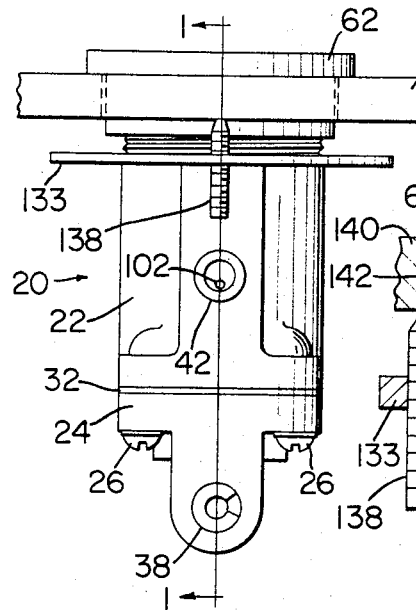

3,411,533
CONTROLLING AND INDICATING
UNIT AND SYSTEM
Louis M. Puster, Knoxville, Tenn., assignor to Robertshaw Controls Company, Richmond, Va., a corporation of Delaware
Filed Feb. 8, 1967, Ser. No. 614,598
14 Claims. (Cl. 137—557)

ABSTRACT OF THE DISCLOSURE

A controlling and indicating unit has a supply port and a transmitter port adjacent one end, a control port and a vent port in a central zone and indicating means at the other end of the casing. A single diaphragm operates the indicating means under conditions produced in such ports. A snap action detent also controls the movement of the diaphragm which requires certain differentials on each side of the diaphragm before the diaphragm and the indicator are snapped from one position to the other.

One end of the casing is provided with a vision lens. An opaque disc has a signal tab that is covered and uncovered by the indicator. The indicator displays one signal, and the tab displays the other.

Background of the invention

This invention is directed to a controlling and indicating unit that is suitable for use in engine control systems to stop operation of the engne if conditions in the engine become unsafe. The indicating means indicates what particular condition in the engine causes the engine to be shut down.

One or more units of this invention may be used in the control systems. For example, the units of this invention may be used in the systems disclosed in the U.S. patent to Louis M. Puster, No. 3,254,670, granted June 7, 1966.

The units of this invention need only one diaphragm, compared with the two diaphragms of the patent. They also have a construction in which an internal passage of the patent can be omitted. Also, the latch and latch operating plunger can be omitted. Many other improvements are made over the prior art as will become apparent as the description proceeds.

Summary of the invention

This invention is therefore directed to a controlling and indicating unit and a system using one or more such units. Prior units and systems are improved and simplified by this invention.

Brief drescription of the drawings

FIGURE 1 is a diagrammatic vertical cross section of a controlling and indicating unit according to this invention, with control port and vent port in unconnected condition.

FIGURE 2 is a view similar to FIGURE 1 with said control port and vent port in connected condition.

FIGURE 3 is a diagrammatic vertical cross section of the unitarily movable diaphragm stack within said controlling and indicating unit.

FIGURE 4 is a reduced scale side elevation taken from the left side of FIGURE 1.

FIGURE 5 is a top view of FIGURE 4.

FIGURE 6 is a diagrammatic illustration of a representative automatic fluid system including a plurality of controlling and indicating units of the type shown in FIGURES 1–5.

Description of the preferred embodiments

Certain words may be used in the specification and claimed subject matter of this application which indicate direction, relative position, and the like. Such words are used for the sake of clearness and brevity. However, it is to be understood that such words are used only in connection with the illustrations in the drawings, and that in actual use, the parts described by such words may have entirely different directions, relative positions and the like. Examples of such words are "vertical," "horizontal," "upper," "lower," etc.

A controlling and indicating unit 20, according to this invention, is suitable for use in many different manners, and in many different systems to control and/or indicate varying conditions in such systems.

By way of example, controlling and indicating units 20, of this invention, may be used in engine control systems of the type shown in United States Puster Patent No. 3,254,670. For example, a plurality of units 20 of this invention may be used instead of the plurality of controller indicators 30, 30' etc., as described in such Puster patent.

However, it is to be understood that controlling and indicating units 20, of this invention, may be used under entirely different conditions, if desired.

A controlling and indicating unit 20 of this invention may include an elongated vertical casing having a main casing body 22 and an attachable casing cover 24. The casing may be substantially cylindrical. The body 22 and cover 24 may be secured together by four screws 26 which extend upwardly through cover 24 and threadedly engage the lower portion of main body 22 in an obvious manner, as shown in dotted lines.

The rims 28 and 30 of the body 22 and cover 24 secure and seal a diaphragm 32 within the casing after the diaphragm stack 34 of FIGURE 3 has bene inserted in the casing during assembly of the unit 20, as further described.

Proper openings at the perimeter of the diaphragm are provided to allow the screws 26 to pass through the diaphragm and to be sealed against passage of fluid.

The unit 20 is easily and efficiently assembled, with important advantages, because of the cooperation of the main body 20, cover 24 and diaphragm stack 34 as will become more fully apparent.

The assembled, elongated, vertical casing 22, 24, has a supply port 36 and a transmitter port 38 at its lower end. It also has a control port 40 and a vent port at its central zone. It also has an indicating means 44 at its upper end.

The indicating means 44 is movable between a plurality of positions, such as the first and second indicating positions shown respectively in full lines in FIGURES 1 and 2. For example, the indicating means 44 may include an indicating member or lever 46, pivoted about a pivot or fulcrum 48 which may be a roll pin secured to the sides of the casing. The lever 46 may be leftwardly or counterclockwise biased by the tension spring 50 which has one end 52 secured to the indicating member 46 and the other end 54 secured to the upper rim 56 of the casing main body 22.

The upper end or flag 58 of the indicating member or lever 46 may have an indicating symbol or color, such as green, to indicate a first, desirable, or safe condition. This symbol is visible through the sight glass or lens 60 which is secured in the body rim 56 by the internally threaded escutcheon, nut or washer 62 which engages the external threads of the rim 56.

A second symbol or color, such as red, may be provided on the upper surface of a tab, leaf or stationary flag 64 which may indicate a second, undesirable or unsafe condition through the sight glass 60.

The glass 60 may be a disc resting on an untransparent or opaque disc 61 which rests in a recess 67 in the body rim 56. The disc 61 has the leaf 64 formed therein. The disc 61 also has a downward tongue 63 which fits into a slot 65 in the rim 56 to orient the disc 61 when it is being fitted into the recess 67.

When the green flag 58 is in its right or most clockwise position of FIGURE 1, its unit 20 indicates a safe condition. When the flag 58 is in its left or most counter-clockwise position of FIGURE 2, the green flag 58 is not visible through glass 60, but the red flag or tab 64 is uncovered and is visible through the sight glass 60 to indicate a second, or undesirable, or unsafe condition.

The assembled casing 22, 24 has an irregular width, vertical casing passageway which extends upwardly from near the bottom or lower end of the casing 22, 24 at and below the lower end connecting means below the throat 66. The passageway extends up through the casing 22, 24 to and above the upper indicating means enclosure 68 at the upper end of passageway of the casing.

The lower end connecting means 66 connects the casing passageway to the supply port 36 and the transmitter port 38. Such casing passageway also forms a central zone connecting means, including upper diaphragm chamber 70 for connecting and disconnecting the control port 40 and the vent port 42. The ports 40 and 42 are connected when the diaphragm 32 is in its lower position, as in FIGURE 2, and are disconnected when the diaphragm 32 is in its upper position, as in FIGURE 1, as is further elsewhere described.

Other parts of the irregular width vertical casing passageway are elsewhere described.

Fluid flow restrictor means 72 and check valve means 74 connect the supply port to the lower end of the casing passageway at throat 66. A transmitter port cavity 76 connects the transmitter port 38 to the casing passageway a the throat 66.

The cavity 76 may also contain a relatively weak compression spring 78 which has one end engaging the check valve or ball 74 and its other end engaging a washer 80 which has a fluid flow opening 82 for the flow of pressure air to a transmitter to be described.

A vertically reciprocable snap action detent 84 is located in a snap action detent chamber 86 adjacent the throat 76 and the transmitter port cavity 66. The detent 84 has a relatively gradually contracting lower end 88, a central snap action ridge 90, and a relatively steep contracting upper end 92.

A snap action spring construction 94 engages the snap action detent 84 and causes a relatively gradual upward force in the detent 84. The spring also causes a snap action force when engaging and is being passed by said snap action ridge. The spring also causes a relatively intense downward force in said detent when engaging the detent upper end. The spring construction 94 and the detent 84, because of the foregoing forces, cause an inverse resistance to movement of said detent by said diaphragm 32 as elsewhere described.

The spring 96 may be an annular, contractable spring located in spring cavity 95 which holds the spring against longitudinal movement. Air can pass freely through the spring from throat 66 to lower diaphragm chamber 96 and vice versa.

A diaphragm construction or stack, FIGURE 3, is connected with the upper end of the snap action detent 84. Such diaphragm stack includes the diaphragm 32 which seals and separates a central enlargement in the casing passageway into a lower diaphragm chamber 96, and an upper diaphragm chamber 70.

A valve seat 98, which may be circular, is provided at the upper end of the upper diaphragm chamber 70. The valve seat 98 has an inner flow connection 100, 102 to the vent port 42 and has an outer flow connection 104 to the control port 40. The valve seat 98 separates or controls the flow of air from the control port 40 to the vent port 42.

A poppet valve means 106 is connected to the diaphragm 32 and is movable by such diaphragm 32 to close the valve seat 98 to disconnect the control port 40 from the vent port 42. The valve means 106 is movable downwardly to open the valve seat 98 to connect the control port 40 and the vent port 42.

Plunger means 108 is connected to and is movable by the poppet valve means 106 to move the indicator means 44 between first and second indicating positions, as shown respectively in full lines in FIGURES 1 and 2. Such plunger means moves the indicating means 44 as the valve means 106 opens and closes the valve seat 98.

The diaphragm stack 34 of FIGURE 3 may be assembled as a unit to be inserted upwardly into the casing body 22. The casing parts 22 and 24 may then be secured together by four screws, more or less, which extend upwardly through the casing at places that do not interfere with the ports. The perimeter of the diaphragm is secured and sealed between the rims 28 and 30 during this assembly.

The valve stack 34 of FIGURE 3 includes an integral poppet retainer body 110, including a cylindrical upper portion 112, a hex-shaped disc 114, a lower pin 116, which has a lower threaded portion 118. The plunger 108 may be adjustably threaded into the cylindrical upper portion 112. Such plunger 108 can be vertically adjusted to obtain the desired movement of the indicating means 44.

The resilient disc-like poppet valve means 106 may be a disc made of any suitable well known sealing material, such as a well known rubber backed synthane which has a hole at the center through which the pin 116 can pass, so that the disc 114 may bear against the disc 106. A poppet valve support is provided in the shape of a disc 120, to which the disc 106 can be adhered, and another disc 122, with a downward sleeve 124. A diaphragm shoe or disc 126 is placed under the diaphragm 32. Then the members between the discs 114 and disc 126 are tightened together by upwardly threading the snap action detent 84 on the threaded portion 118 of the pin 116. The lowest internally threaded portion 128 of the detent 84 extends down below the threaded portion 118, and is provided with a screwdriver slot 130, so that the detent 84 and the hex disc 114 can be relatively turned to tighten the detent 84 against the disc 126, to provide a tight stacked construction. The plunger or plunger means 108 is threaded into a threaded opening 132 in the cylindrical portion 112 of the valve retainer. The plunger 108 may be calibrated by turning the same within the threaded opening 132. An O-ring 131 prevents air leakage about the plunger 108.

A mounting ring 133 is assembled past the threaded rim 56 and has a center hole 134 sufficiently large to fit over the threaded rim 56 and to bear against projections 136 on the outside of the body 22. The ring 133 is free to rotate to any desired position to make accessible two jack screws 138 for mounting of the unit 20 on a panel 140, which has an opening 142 to receive the escutcheon 62. When the ends of the jack screws 138 are tightened against the panel 140, the unit 20 is firmly mounted in the panel 140.

In operation of the unit 20, air is supplied to the supply port 36, then through restrictor orifice 72 and past the free flow direction of the check valve 74. If the associated transmitter which is connected to the transmitter port 38 is safe or in desirable condition, with its valve closed, pressure air will build up into the lower diaphragm chamber 96 through throat 66, detent chamber 86, and annular coil spring 94.

The poppet valve 106 is forced against the poppet valve seat 98 and prevents pressure air, which is admitted to the control port 40, from venting out into the vent port 42. As superatmospheric air pressure builds up in the upper diaphragm cavity 70 from control port 40 through passageway 104, the pressure unbalance of the vented air inside valve seat 98 holds the poppet valve 106 closed against the seat 98 even though the original pressure effect to close the valve in the lower diaphragm cavity 96 is cancelled or vented. In this position the plunger 108 holds the indicator flag 58 in the slotted recess in its right or most clockwise position, to indicate green, as shown in FIGURE 1.

If the transmitter connected to the transmitter port 38 becomes unsafe, and its valve is opened, air pressure is reduced in the transmitter cavity 76 and up through to the lower diaphragm chamber 96. This causes a super-atmospheric and near atmospheric pressure differential between the diaphragm cavities 96 and 70. When the pressure differential across the diaphragm 32 is great enough to overcome the pressure effect on the unbalanced area of the valve seat 98 on the poppet valve 106, the diaphragm stack 34 is urged downwardly.

As the stack 34 begins to move downwardly from the seat 98, the inwardly biased spring 94 resists this movement until the ridge 90 passes the center of the spring 94. Since the diameter of the detent 84 is then sharply reduced at the surface 92, the resistance exerted by the spring 94 is greatly reduced. The differential pressure across the diaphragm 32 is then sufficient to snap the stack 34 to its bottommost condition, as shown in FIGURE 2. The spring 94 will continue to hold the stack in this position. With the stack in its bottommost position, plunger 108 is retracted and spring 50 biases the indicating flag 58 to its left position, as shown in FIGURE 2 thus exposing the red surface of the tab 64 in the window or glass 60. In this position, air is free to flow from the control port 40 through the passageways 104 and 102 into the vent port 42.

The passageway 102 is so located relative to the upper end of the cylindrical portion 112 that air flow is restricted until the stack 34 moves sufficiently to snap detent 84 through the spring 94. This is to prevent false signaling under extreme conditions when poppet 106 moves away from the seat 98 just enough to vent the control port without forcing the detent 84 through the spring 94. Also, the stem or plunger 108 can be adjusted to compensate for manufacturing tolerances by means of the threaded connection to the cylindrical portion 112 to position the flag 58 so that a full red signal is displayed in the full counterclockwise position, and a full green indication in its full clockwise position.

With the stack 34 in its lower position, air can be supplied to the supply port 36 and with a safe transmitter having its valve closed, or with the port 38 blocked, a pressure builds up in lower diaphragm cavity 96 sufficiently to snap detent 84 through the garter spring 94, closing valve 106, and the green portion of flag 56 entering above the tab 64.

It is preferred that the profile of detent 84, the size and weight of the garter spring 94, are such that, in combination with the effective area of diaphragm 32, this action occurs within a specific pressure band. To prevent false signaling and/or fluttering, it is desirable that the differential pressure effect between the diaphragm cavity 96 and the cavity 70 be such that the pressure at transmitter port 38 be always higher to give a green signal than the pressure required to give a red signal.

Therefore, the effective area of diaphragm 32 with the higher pressure in cavity 96 (to give a green signal) is much less than the effective area with the higher pressure in cavity 70 (to give a red signal). Also, the ramp profile of detent 84 is much steeper and offers more resistance to movement of the stack in one direction than the gradual slope 88 of the detent 84 in the other direction. As an example, with 20 p.s.i. supplied to the supply port 36, the indicator 46 can reset to give a green signal between 14 and 18 p.s.i. at the transmitter port 38. The pressure can then drop to between 13 and 8 p.s.i. at port 38 for the indicator 46 to trip and give a red signal.

If the unit 20 is one of a group in a system, as described above, and it is associated with a transmitter that remains safe with its valve closed, while another unit has its transmitter valve opened because of an unsafe condition, the safe unit indicator will remain green even if the system pressure is lost, due to the holding action of the detent 84. In the same manner, it will retain a red signal. It is preferred, however, that in reaching a green signal with the system pressure lost, that the pressure in cavity 96 be retained by check valve 74 until the pressure in cavity 70 is lost. This is done with check valve 74 preventing a sudden rush of air out of the orifice 72 and into the supply port 36.

This is illustrated in FIGURE 6.

FIGURE 6 shows how units 20, 20' of this application can be substituted for the patent units 30 and 30' in the automatic engine control systems of patent FIGURES 2, 3 and 4 of the Puster Patent No. 3,254,670.

The units 20, 20' of FIGURE 6 of this application have supply ports 36, 36' transmitter ports 38, 38', control ports 40, 40' and vent ports 42, 42' substantially in the same relative positions as patent FIGURES 2, 3 and 4 supply ports 34, transmitter port 32, control ports 42 and vent ports 59. In view of this the units 20, 20' of this application can be substituted in the patent system of patent FIGURES 2, 3 and 4 with no substantial change in the pipes, valves, etc. of the patent system which supply these ports.

FIGURE 6 of this application shows an automatic pipe, valve, etc. system on the left half of FIGURE 6 which is substantially identical with the system shown in patent FIGURE 2. The pipes which are connected to the patent ports 34, 32, 42 and 59 in FIGURE 2 of the patent are now connected respectively to application ports 36, 38, 40 and 42 in application FIGURE 6.

It is believed unnecessary to illustrate the substitution of application units 20, 20' in patent FIGURES 3 and 4, since it is obvious from application FIGURE 6 how the patent system of FIGURES 3 and 4 will operate application units 20 and 20' of application FIGURE 6.

The left half of FIGURE 6 of this application illustrates an automatic control system 150 which may be identical with the left halves of patent FIGURES 2, 3 and 4. In such system 150, the operator may open the air supply valve 152, and manipulate valves 154 and 156 as described in the patent. He also may open manual fuel supply valve 158. According to the detailed description in the patent, to which reference is hereby made, the system 150 will supply pressure air to the supply pipes 160 and 160' which are connected to supply ports 36, 36' of units 20 and 20'. These units are assumed originally to be indicating an unsafe condition produced by previous opening of the transmitter valves 162, 162' which presumably were opened by the unsafe sensing by the transmitter sensors 164, 164'.

However, it is assumed that the unsafe conditions sensed by the sensors 164 and 164' have been corrected, and that the transmitter valves 162 and 162' have been closed by the sensing of safe conditions by the sensors 164 and 164'.

Under these conditions, pressure air passes through the restrictors 72 and 72' and past the check valves 74 and 74' and to the transmitter ports 38 and 38'. The restricted air then flows through the transmitter pipes 166 and 166' and the air is then stopped by the closed transmitter valves 162 and 162'. This builds up air pressure and causes the pressure air to pass through the connecting means 66 and 66' to diaphragm chambers 96 and to press against the diaphragms 32 and 32' and to flex them rightwardly to the dotted line position. This in turn causes the poppet valve means 106 and 106' also to move rightwardly against the valve seats 98 and 98'. Pressure air also passes the restrictor 168 and causes pressure air to flow through the pipe construction 170 and to be delivered to the control ports 40 and 40' and into chambers 70, 70. However, the pressure air in each chamber 96 has a superior pressure balance as against each chamber 70. This pressurizing of the system of FIGURE 6, also causes the opening of the fuel automatic valve 172, so that fuel is fed to the engine 174.

Thereafter, the system operates without interruption as long as no unsafe sensor action is sensed on the sensors 164 and 164'. This is illustrated in FIGURE 3 of the Puster patent, and is obvious, if application units 20, 20' are substituted in FIGURE 3 for the patent units 30 and 30'.

However, if an unsafe condition is sensed by the sensor 164, for example, and its transmitter valve 162 is opened, then the condition illustrated in the patent FIGURE 4 will occur, and will vent transmitter port 38. The diaphragm 32 will move leftwardly and cause control port 40 to be vented into vent port 42. The indicator 46 will register an unsafe condition.

However, the check valve 74' in unit 20' will maintain a pressure in chamber 96' and will maintain the diaphragm 32' in a rightward position so indicator 46' will continue to register a safe condition.

By reference to the Puster Patent 3,254,670, it is now possible to determine how the units 20 and 20' of this application will operate in FIGURES 2, 3 and 4 of the Puster Patent 3,254,670 properly to control the engine supply system.

Many important advantages are obtained by using applicant's units 20 and 20' instead of the Puster patent units 30 and 30', because of the simplicity and relative cheapness of applicant's units 20 and 20' as compared with the units 30 and 30' of the Puster patent.

While applicant's units 20 and 20' operate in a somewhat equivalent manner to that of the Puster patent units 30 and 30', there is no suggestion in the Puster Patent 3,254,670, that those units 30 and 30' can or should be modified and changed to the construction of applicant's units 20 and 20' of this application.

The unit 20 of this application eliminates many details of the patent unit 30. For example, the following patent members are eliminated: diaphragm 128, plunger 164, latch 156, passageway 132, block 112. Also, the unit 20 is made from two uniform diameter blocks 22 and 24, and does not require the large patent indicator housing 222. Many other advantages are present.

While the preferred form of the invention has been disclosed in accordance with the statutes, many other forms may be used, all coming within the scope of the claimed subject matter.

What is claimed is:

1. A controlling and indicating unit comprising,
    an elongated casing having a supply port and a transmitter port at its lower end, a control port and a vent port at its central zone and an indicating means at its upper end movable between first and second indicating positions,
    said casing having an irregular width vertical casing passageway with lower end connecting means connecting said passageway to said supply port and said transmitter port, central zone connecting means connecting said passageway to said control port and said vent port, said passageway having an indicating means enclosure at its upper end,
    flow restrictor means and check valve means at said lower end connecting means connecting said supply port to the lower end of said casing passageway,
    a transmitter port cavity in said lower end connecting means connecting said transmitter port to the lower end of said casing passageway,
    a vertically reciprocable snap action detent located in a snap action detent chamber formed in said casing passageway adjacent said transmitter port cavity, said detent having a relatively gradually contracting lower end, a central snap action ridge and a relatively steep contracting upper end,
    snap action spring means engaging said snap action detent and causing a relatively gradual upward force in said detent when engaging said detent lower end, a snap action force when engaging and passing said snap action ridge, and a relatively intense downward force in said detent when engaging said detent upper end,
    a diaphragm construction secured by said upper end of said snap action detent, said diaphragm construction sealing and separating a central enlargement in said casing passageway into a lower diaphragm chamber and an upper diaphragm chamber,
    a poppet valve seat at the upper end of said upper diaphragm chamber with an inner flow connection to said vent port and outer flow connection to said control port,
    a poppet valve means connected to said diaphragm and movable by said diaphragm to close said valve seat to disconnect said control port from said vent port, said valve means being movable to open said valve seat to connect said control port and said vent port,
    plunger means connected to and movable by said poppet valve means and actuating said indicator means to move said indicator means between said first and second indicating positions as said valve means opens and closes said valve seat.

2. A unit according to claim 1 in which said casing comprises an upper main casing body and a lower casing cover, said body and cover having mating rims surrounding said central passageway enlargement, said rims securing and sealing a perimeter of a diaphragm of said diaphragm construction, said diaphragm separating said enlargement into said upper and lower diaphragm chambers.

3. A unit according to claim 1 in which a unitary diaphragm stack is vertically movable in said passageway and has a vertically adjustable plunger of said plunger means at the upper end of said stack, said poppet valve means adjacent said plunger, a diaphragm adjacent said poppet valve means, and a detent adjacent said diaphragm and at the bottom of said stack.

4. A unit according to claim 3 in which said poppet valve means includes an upper cylindrical portion attached to a central hex shaped disc, and a lower pin attached to and below said hex shaped disc, said pin having a lower threaded portion threadedly to receive said detent, said plunger being above and threaded into said upper cylindrical portion.

5. A unit according to claim 4 in which said poppet valve means also includes a sealing disc, a supporting disc, and a second disc with a sleeve depending therefrom, all below said hex shaped disc and above said diaphragm and surrounding said pin, and a diaphragm disc below said diaphragm and engaged by the top of said detent.

6. A unit according to claim 1 in which said supply port is a threaded radial opening in the lower side portion of said casing with an inward radial restrictor passageway forming said restrictor means, and with an enlarged check valve seat at the inner end of said restrictor passageway, and with a ball check valve engaging said check valve seat, and said transmitter port is a threaded radial opening aligned with said supply port and has an inward radial transmitter port cavity connecting said transmitter port to said lower end of said casing passageway and to said check valve seat and containing said ball check valve, a check valve spring and a disc washer forming a spring end abutment for said check valve spring.

7. A controlling and indicating unit according to claim 1 combined with another unit according to claim 1 and with an automatic pressure fluid supply means and device fluid control means system, said units having their supply ports connected to said fluid pressure supply means and their control ports connected to said device fluid control means, and with their transmitter ports connected to respective transmitter valves of transmitters having condition sensors closing said respective transmitter valves when said respective sensors sense a desired condition, and opening said respective transmitter valves when said sensors sense an undesired condition.

8. Controlling and indicating units and system according to claim 7 in which said fluid pressure supply means includes a compressed air supply and said device is an engine with a power supply controlled by said fluid control means, and said transmitter sensors sense respectively safe and unsafe conditions, said automatic fluid supply means and fluid control means causing said engine power to be supplied when all of said sensors sense safe conditions and causing said engine power supply to be stopped when one of said sensors senses an unsafe condition, and causing said compressed air supply to be stopped to said supply ports when said one of said sensors senses an unsafe condition.

9. Controlling and indicating units and system according to claim 8 in which said respective detent means hold said respective indicating means in their initial positions after said one of said sensors senses an unsafe condition even after said compressed air supply is stopped to said supply ports.

10. A controlling and indicating unit including,
a casing with a diaphragm in an intermediate zone of said casing, said casing having a lower diaphragm chamber below said diaphragm and an upper diaphragm chamber above said diaphragm,
said casing having a supply port and a transmitter port below said diaphragm with lower connecting means connecting said supply port and said transmitter port to said lower diaphragm chamber,
said casing having a control port and a vent port above said diaphragm with upper connecting means connecting said control port and said vent port to said upper diaphragm chamber,
a restrictor and a check valve between said supply port and said lower diaphragm chamber,
a poppet valve seat in said upper diaphragm chamber with vent passageway means connecting the interior of said poppet valve seat with said vent port, said poppet valve seat having control passageway means connecting the exterior of said poppet valve seat with said control port,
a diaphragm stack vertically movable in said casing and having a vertically movable plunger at the upper end of said stack, a poppet valve means closing and opening said poppet valve seat, means on said stack holding said diaphragm adjacent said poppet valve means, and a snap action detent means at the lower end of said stack adjacent said diaphragm,
a snap action spring means engaging said snap action detent means and causing a relatively gradual upward force in said stack when engaging said detent means lower end to close said poppet valve seat, a snap action force when engaging and passing an intermediate snap action ridge on said detent means, and a relatively intense downward force in said stack when engaging said detent upper end to open said poppet valve seat,
an indicating means at the upper end of said casing movable between first and second indicating positions by said plunger when said stack is respectively in its upper and lower positions.

11. A controlling and indicating unit according to claim 10 combined with another unit according to claim 10 and with an automatic pressure fluid supply means and device fluid control means system, said units having their supply ports connected to said fluid pressure supply means and their control ports connected to said device fluid control means, and with their transmitter ports connected to respective transmitter valves of transmitters having condition sensors closing said respective transmitter valves when said respective sensors sense a desired condition, and opening said respective transmitter valves when said sensors sense an undesired condition.

12. Controlling and indicating units and system according to claim 11 in which said fluid pressure supply means includes a compressed air supply and said device is an engine with a power supply controlled by said fluid control means, and said transmitter sensors sense respectively safe and unsafe conditions, said automatic fluid supply means and fluid control means causing said engine power to be supplied when all of said sensors sense safe conditions and causing said engine power supply to be stopped when one of said sensors senses an unsafe condition, and causing said compressed air supply to be stopped to said supply ports when said one of said sensors senses an unsafe condition.

13. Controlling and indicating units and system according to claim 12 in which said respective detent means hold said respective indicating means in their initial positions after said one of said sensors senses an unsafe condition even after said compressed air supply is stopped to said supply ports.

14. Controlling and indicating units and system according to claim 13 in which said respective detent means each has a holding power greater in one direction than in the other direction.

References Cited

UNITED STATES PATENTS

| 2,192,224 | 3/1940 | Forsberg | 116—114.26 XR |
| 3,129,722 | 4/1964 | Wagner | 137—557 |
| 3,254,670 | 6/1966 | Puster | 137—557 |

HENRY T. KLINKSIEK, *Primary Examiner.*